United States Patent
Yoon et al.

(10) Patent No.: US 8,758,923 B2
(45) Date of Patent: Jun. 24, 2014

(54) BATTERY PACK

(75) Inventors: Ji-Hyoung Yoon, Yongin-si (KR); Kwon Sohn, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 659 days.

(21) Appl. No.: 12/926,222

(22) Filed: Nov. 3, 2010

(65) Prior Publication Data
US 2011/0293974 A1 Dec. 1, 2011

(30) Foreign Application Priority Data

Jun. 1, 2010 (KR) .......................... 10-2010-0051962

(51) Int. Cl.
*H01M 10/50* (2006.01)
*H01M 2/36* (2006.01)
*H01M 2/02* (2006.01)

(52) U.S. Cl.
USPC .............. 429/120; 429/72; 429/178; 429/179

(58) Field of Classification Search
CPC ... H01M 2/30; H01M 10/50; H01M 10/5004; H01M 10/5012

USPC .................... 429/120, 72, 178, 179
See application file for complete search history.

(56) References Cited

U.S. PATENT DOCUMENTS 6,042,961 A 3/2000 Verhoog et al.
2010/0279159 A1 11/2010 Meintschel et al.

FOREIGN PATENT DOCUMENTS

| JP | 09-219213 A | 8/1997 |
| JP | 11-144756 A | 5/1999 |
| JP | 2001-236145 A | 8/2001 |
| WO | WO 2008/104359 A1 | 9/2008 |

OTHER PUBLICATIONS

Korean Notice of Allowance in KR 10-2010-0051962, dated May 20, 2012 (Yoon, et al.).

*Primary Examiner* — Helen O Conley
(74) *Attorney, Agent, or Firm* — Lee & Morse, P.C.

(57) ABSTRACT

A battery pack including a housing for accommodating a plurality of secondary batteries; a cooling unit for cooling the secondary batteries, the cooling unit including an inlet through which a cooling fluid flows in and an outlet through which the cooling fluid flows out; and a terminal unit detachably connectable to the cooling unit, the terminal unit including a first terminal for circulating the cooling fluid.

27 Claims, 14 Drawing Sheets

BATTERY PACK

BACKGROUND

1. Field

Embodiments relate to a battery pack.

2. Description of the Related Art

As the number of gasoline vehicles increases, air pollution becomes increasingly problematic due to waste gases including various harmful components, e.g., nitrogen oxide generated due to combustion of fuel and carbon monoxide and hydrocarbon generated due to incomplete combustion, produced by the increasing number of gasoline vehicles. Also, as fossil fuel is expected to be exhausted in the future, the development of a next-generation energy source and the development of electric vehicles are major issues among people. When electric vehicles are commercialized, the mileage or range of an electric vehicle may depend on the performance of a battery. In general, batteries may not easily provide electrical energy for ensuring a sufficient mileage or range. If a vehicle uses gasoline, diesel, or liquefied petroleum gas (LPG) as an energy source, the fuel may be rapidly supplied at a gas station or an LPG station. However, since electric vehicles require a long time for charging even when electricity charging stations are readily available, electric vehicles may not be easily commercialized. As such, in electric vehicles, the improvement of the performance of batteries is regarded as an important issue in comparison to other technical issues.

SUMMARY

Embodiments are directed to a battery pack, which represents advances over the related art.

It is a feature of an embodiment to provide a battery pack in which a cooling unit and a charge/discharge terminal are formed on a same interface.

At least one of the above and other features and advantages may be realized by providing a battery pack including a housing for accommodating a plurality of secondary batteries; a cooling unit for cooling the secondary batteries, the cooling unit including an inlet through which a cooling fluid flows in and an outlet through which the cooling fluid flows out; and a terminal unit detachably connectable to the cooling unit, the terminal unit including a first terminal for circulating the cooling fluid.

The battery pack may further include a check valve having a first side and a second side, the check valve being open when the cooling fluid flows from the first side to the second side and being closed when the cooling fluid flows from the second side to the first side, wherein the check valve is disposed in at least one of the cooling unit and the first terminal.

The cooling unit may further include a first heating unit on circumferential surfaces of at least one of the inlet and the outlet of the cooling unit, the first heating unit being for vaporizing the cooling fluid.

The first terminal may be connected to the cooling unit so as to form a closed loop.

The first terminal may include a circulator for circulating the cooling fluid.

The cooling unit may include a plurality of cooling packs connected to each other by cooling connection members.

The housing may accommodate a plurality of battery modules, and each of the battery modules may include a plurality of secondary batteries arranged in a row; a plurality of the cooling packs in thermal co-operation with the plurality of secondary batteries; a pair of end plates at ends of the secondary batteries and the cooling packs; restraint plates, the restraint plates compressing the secondary batteries in a length direction, supporting the cooling packs, and being connected to side portions of the end plates; a top plate connected to top portions of the end plates; and a bottom plate connected to bottom portions of the end plates.

One of the cooling packs may be between the secondary batteries and the bottom plate.

The cooling packs may be between the secondary batteries and the restraint plates.

The cooling packs may include heat pipes.

At least one of the end plates may include cooling holes, the cooling connection members being connected to the cooling packs through the cooling holes.

The battery pack may further include a charge/discharge terminal electrically connected to the secondary batteries, the charge/discharge terminal being on the housing; and a second terminal in the terminal unit, the second terminal unit being detachably, electrically connected to the charge/discharge terminal and being for charging/discharging the secondary batteries.

A shape of cross-sections of the inlet and the outlet of the cooling unit may be asymmetrical to a shape of cross-sections of the charge/discharge terminal.

The battery pack may further include a battery interface on the housing, the battery interface being detachably connected to the terminal unit and in which the charge/discharge terminal and the inlet and the outlet of the cooling unit are disposed.

The battery interface may include a first insulation unit.

The second terminal may include insulation members.

The inlet and the outlet of the cooling unit may be below the charge/discharge terminal with respect to gravity.

In a power providing condition of the battery pack, in which the battery pack provides power to a vehicle, the terminal unit may be detachably connected to the cooling unit.

In a charging/discharging condition of the battery pack, the terminal unit may be detachably connected to the cooling unit and disposed on a station outside of a vehicle.

The battery pack may further include a connection unit between the battery interface and the terminal unit, the connection unit being detachably connected to each of the battery interface and the terminal unit.

The connection unit may include a cooling connection terminal, the cooling connection terminal having surfaces detachably connected to the inlet and the outlet of the cooling unit and having other surfaces detachably connected to the first terminal; and a power connection terminal, the power connection terminal having surfaces detachably connected to the charge/discharge terminal and having other surfaces detachably connected to the second terminal, and wherein a shape of cross-sections of the cooling connection terminal is asymmetrical to a shape of cross-sections of the power connection terminal.

In a power providing condition of the battery pack, in which the battery pack provides power to a vehicle, the terminal unit may be detachably connected to the cooling unit through the connection unit.

In a charging/discharging condition of the battery pack, the terminal unit may be detachably connected to the cooling unit through the connection unit and may be disposed on a station outside of a vehicle.

The connection unit may further include a check valve having a first side and a second side, the check valve being open when the cooling fluid flows from the first side to the second side and being closed when the cooling fluid flows from the second side to the first side.

The connection unit may further include a second insulation unit.

The connection unit may further include a second heating unit for vaporizing cooling fluid on a surface of the connection unit.

The second terminal may be connected to an external power supply device.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
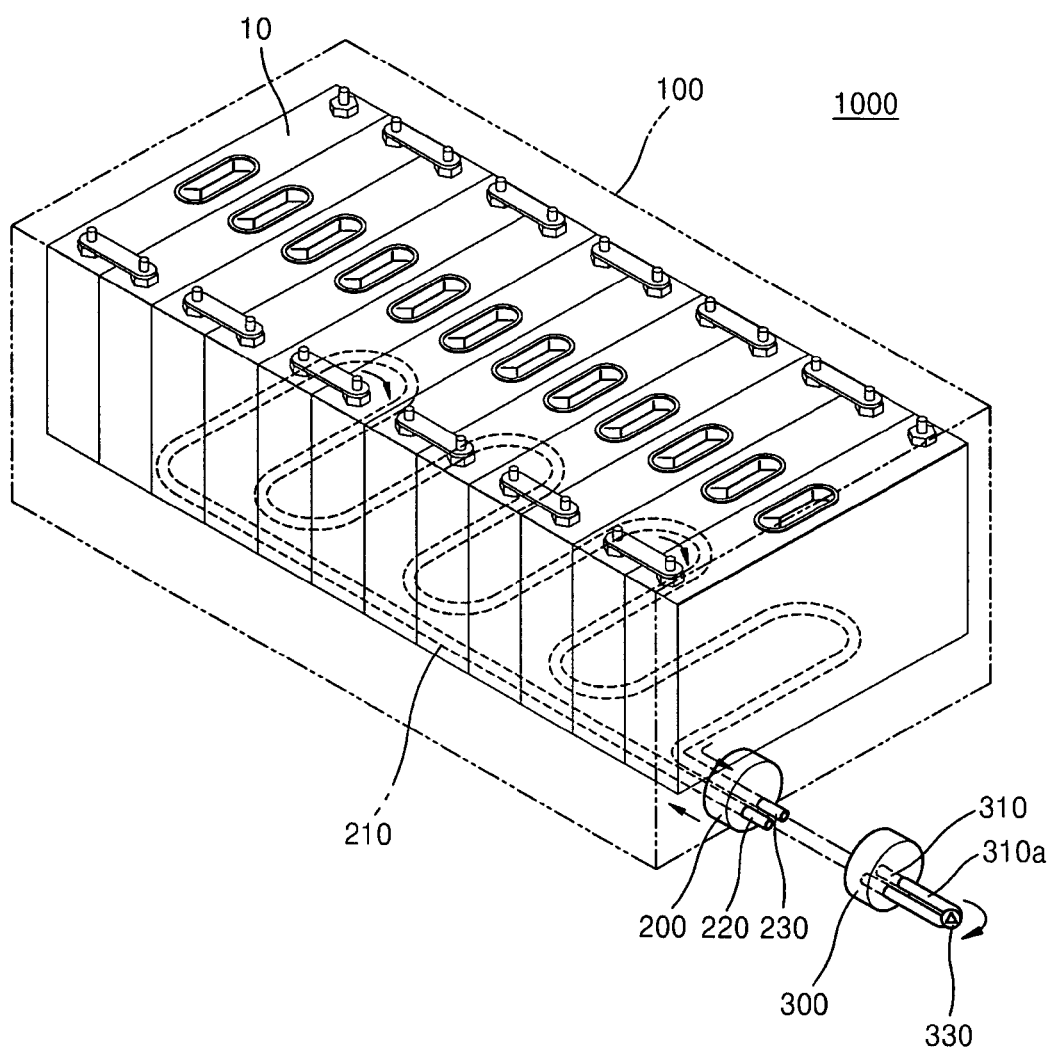
FIG. 1 illustrates a conceptual view of a battery pack according to an embodiment.

Korean Patent Application No. 10-2010-0051962, filed on Jun. 1, 2010, in the Korean Intellectual Property Office, and entitled: "Battery Pack," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. Further, it will be understood that when an element is referred to as being "under" another element, it can be directly under, and/or one or more intervening elements may also be present.

In addition, it will also be understood that when an element is referred to as being "between" two elements, it can be the only element between the two elements, or one or more intervening elements may also be present. Like reference numerals refer to like elements throughout.

Figure 2:
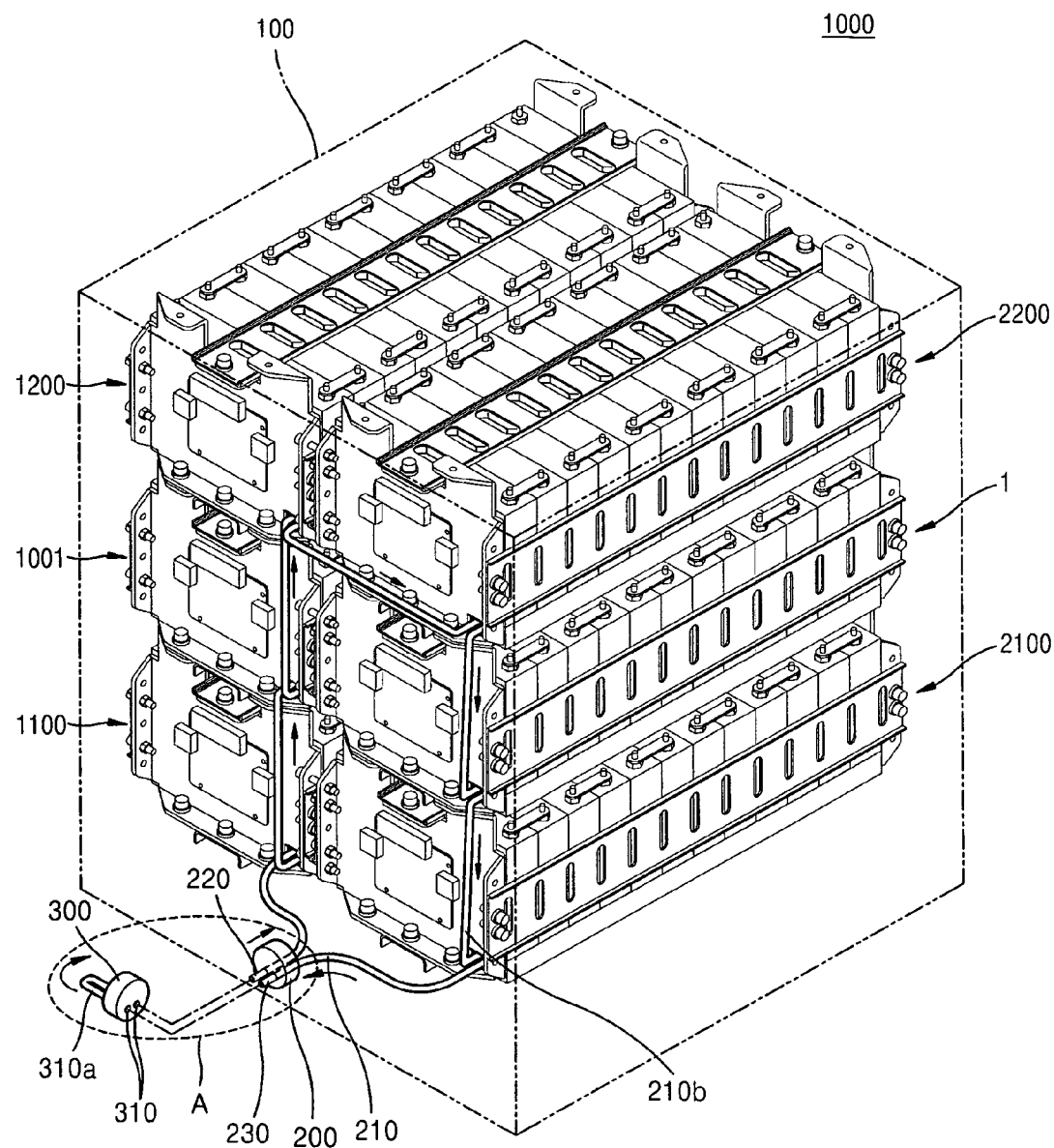
FIG. 2 illustrates a perspective view of the battery pack of FIG. 1.

A battery pack 1000 according to an embodiment will now be described with reference to FIGS. 1 and 2. FIG. 1 illustrates a conceptual view of the battery pack 1000 according to an embodiment. FIG. 2 illustrates a perspective view of the battery pack 1000 of FIG. 1. Referring to FIGS. 1 and 2, the battery pack 1000 may include a housing 100, a cooling unit 210, and a terminal unit 300. In an implementation, the housing 100 may accommodate a plurality of secondary batteries 10.

Referring to FIGS. 1 and 2, the cooling unit 210 may circulate a cooling fluid to cool the secondary batteries 10.

In order to cool the secondary batteries 10, the battery pack 1000 may include an inlet 220 through which the cooling fluid flows in and an outlet 230 through which the cooling fluid flows out. The inlet 220 and the outlet 230 may be separate from the cooling unit 210, as illustrated in FIGS. 1 and 2. However, in an implementation, the inlet 220 and the outlet 230 may not always be separate from the cooling unit 210. That is, if the cooling unit 210 has a shape of an open tube, both end holes of the tube may separately be the inlet 220 and the outlet 230. In this case, the cooling unit 210 may be disposed in the housing 100, as illustrated in FIG. 1. However, in an implementation, the location of the cooling unit 210 may variously change to cool the secondary batteries 10. For example, the cooling unit 210 may be disposed on a surface of the housing 100 to cool the secondary batteries 10. The terminal unit 300 may be detachably connected to the cooling unit 210 and may include a first terminal 310 corresponding to the inlet 220 and the outlet 230 to circulate the cooling fluid. As illustrated in FIG. 1, the first terminal 310 may be connected to the cooling unit 210 to form a closed loop of a first terminal tube 310a through which the cooling fluid circulates. Also, the first terminal 310 may be connected to or may include a circulator 330 to provide a driving power for circulating the cooling fluid. In this case, although not shown in FIGS. 1 and 2, the circulator 330 may be disposed in the housing 100. In particular, in a power providing condition of the battery pack 1000, the terminal unit may re-circulate the cooling fluid by way of the circulator 300.

Figure 3:
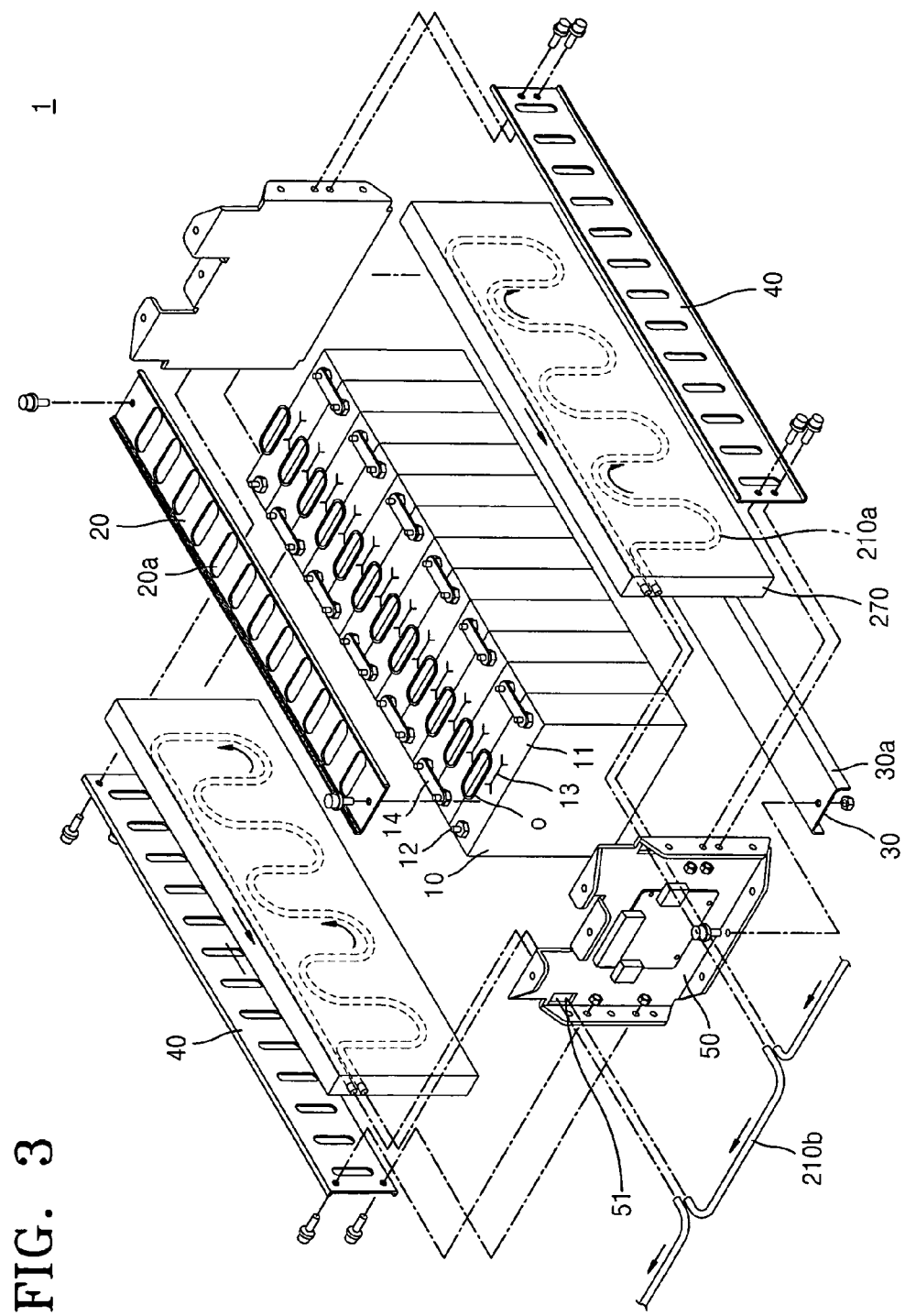
FIG. 3 illustrates an exploded perspective view of a battery module including cooling packs, according to an embodiment.
Figure 4:
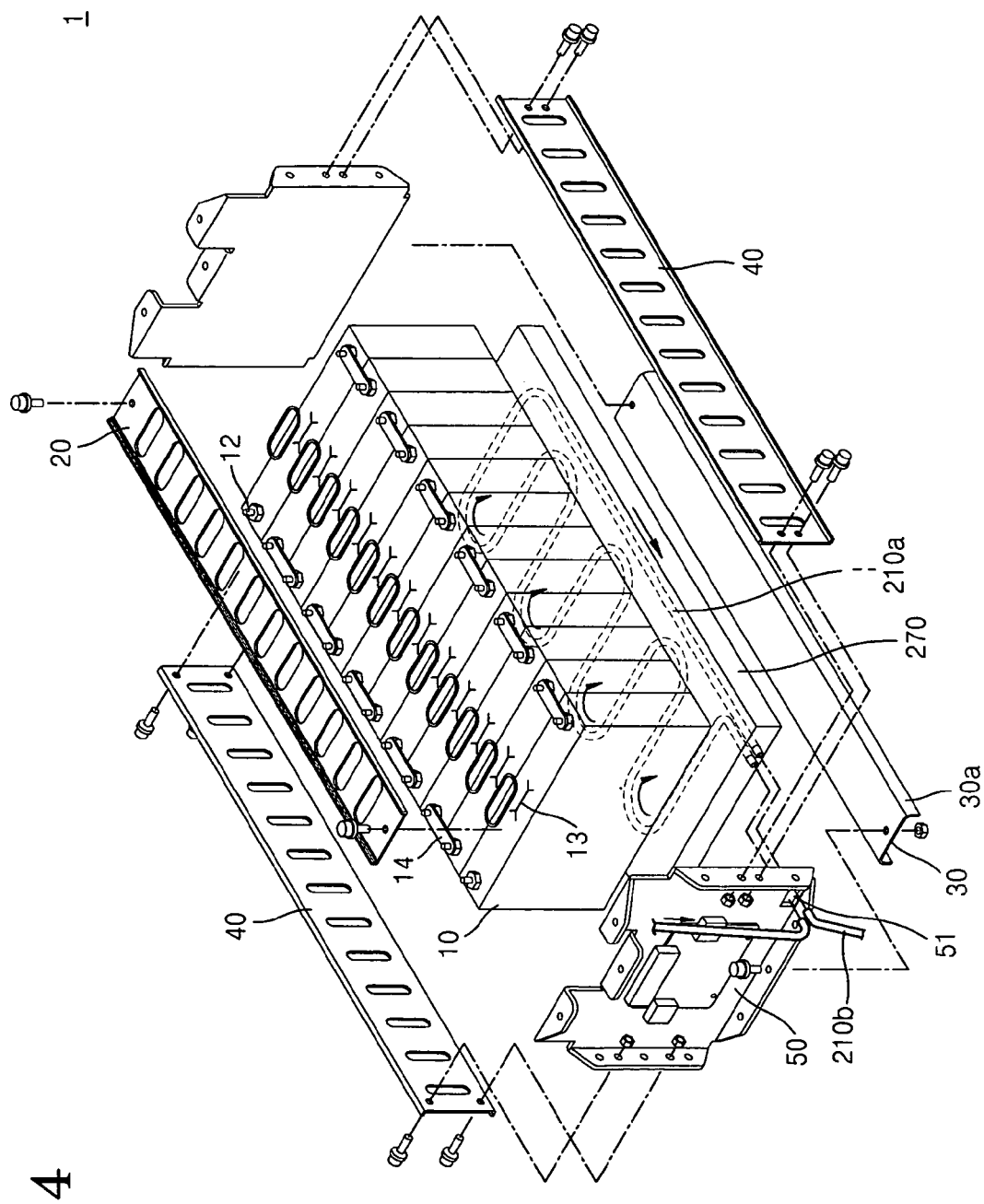
FIG. 4 illustrates an exploded perspective view of a modified example of the battery module of FIG. 3.

Referring to FIG. 2, the battery pack 1000 may include a plurality of battery modules 1, 1001, 1100, 1200, 2100, and 2200, the housing 100, the cooling unit 210, and the terminal unit 300. The battery module 1 will now be described with reference to FIGS. 3 and 4. FIG. 3 illustrates an exploded perspective view of the battery module 1 including cooling packs 270, according to an embodiment. FIG. 4 illustrates an exploded perspective view of a modified example of the battery module 1 of FIG. 3.

Referring to FIG. 3, the battery module 1 may include a plurality of the secondary batteries 10, a top plate 20, a bottom plate 30, restraint plates 40, end plates 50, and the cooling packs 270.

Here, each of the secondary batteries 10 may include an electrode assembly (not shown), a sealing structure 11, and electrode terminals 12. The electrode assembly may include a positive electrode (not shown), a separator (not shown), and a negative electrode (not shown) wound or stacked together. The sealing structure 11 may accommodate the electrode assembly. The electrode terminals 12 may protrude from the sealing structure 11 and may be electrically connected to an element outside of the battery module 1. In this case, the sealing structure 11 may include a vent 13. The vent 13 may allow a gas generated in the sealing structure 11 to be discharged from the structure 11.

The secondary batteries 10 may contact each other and may be aligned in a predetermined direction. In this case, the secondary batteries 10 may be electrically connected to each other. Here, the secondary batteries 10 may be connected to each other, e.g., in series or in parallel. In order to connect the secondary batteries 10 in series, positive and negative electrodes of the secondary batteries 10 may be alternately aligned. In this case, the electrode terminals 12 of the secondary batteries 10 may be connected to each other via bus bars 14.

In an implementation, the secondary batteries 10 may be lithium (Li) secondary batteries. In each of the secondary batteries 10 containing lithium (Li), the electrode assembly may expand and contract as charge or discharge occurs. The expansion and contraction of the electrode assembly may act as a physical force on the sealing structure 11 and thus the sealing structure 11 may physically expand and contract in correspondence with the deformation of the electrode assembly. Due to repeated expansion and contraction, the deformation of the sealing structure 11 may be fixed; and the expansion in volume may increase resistance and reduce the efficiency of the secondary batteries 10. Accordingly, a pair of the end plates 50 may be disposed at ends of the secondary batteries 10, which are aligned in the predetermined direction and electrically connected to each other. A pair of the restraint plates 40 may be connected to side portions of the end plates 50, so that the secondary batteries 10 may be compressed so as not to extend in a length direction due to expansion and contraction. Here, the secondary batteries 10 are not limited to Li batteries and may be any type of secondary batteries that are chargeable and dischargeable, e.g., nickel (Ni)-cadmium (Cd) or Ni-manganese (Mn) batteries.

The top plate 20 may be disposed on the secondary batteries 10 and may be connected to top portions of the end plates 50. In this case, the top plate 20 may have openings 20a corresponding to the vents 13 of the secondary batteries 10.

The bottom plate 30 may be disposed under the secondary batteries 10 to support the weight of the secondary batteries 10 and may be connected to bottom portions of the end plates 50. Referring to FIG. 3, in order to support the weight of the secondary batteries 10, the bottom plate 30 may include bottom plate bent portions 30a. In this case, the bottom plate bent portions 30a may be bent downward.

Here, the cooling packs 270 may be disposed on the battery module 1 to remove heat generated by the secondary batteries 10 when charge or discharge occurs. The cooling packs 270 may include cooling tubes 210a through which the cooling fluid flows. The cooling tubes 210a may be connected to each other via cooling connection members 210b. The cooling tubes 210a and the cooling connection members 210b may be connected to form the cooling unit 210. Referring to FIGS. 3 and 4, the cooling tubes 210a and the cooling connection members 210b may be connected to each other to circulate the cooling fluid. For example, as illustrated in FIG. 3, the cooling tubes 210a of the cooling packs 270 may be connected to each other via the cooling connection members 210b. Also, as illustrated in FIG. 4, the cooling packs 270 of neighboring battery modules may be connected to each other via the cooling connection members 210b.

As illustrated in FIGS. 3 and 4, e.g., one or two, cooling holes 51 may be formed in one of the end plates 50 so that the cooling tubes 210a and the cooling connection members 210b may be connected through the cooling holes 51. However, the cooling tubes 210a may be connected to the cooling connection members 210b disposed outside the battery module 1 by using any of various suitable methods. For example, the cooling tubes 210a may be connected to the cooling connection members 210b through a gap formed in the battery module 1 without forming an additional component.

Also, the cooling packs 270 may be disposed at various locations on the battery module 1. As illustrated in FIG. 3, the cooling packs 270 may be disposed between the secondary batteries 10 and the restraint plates 40. However, the locations of the cooling packs 270 are not limited thereto. For example, referring to FIG. 4, the cooling pack 270 may be disposed between the bottom plate 30 and the secondary batteries 10. The structures illustrated in FIGS. 3 and 4 are merely examples for configuring the battery module 1 and the shape and location of the cooling packs 270 may vary.

The cooling unit 210 may be connected to the first terminal 310 of the terminal unit 300 to form a closed loop through which the cooling fluid circulates. As such, the cooling fluid may circulate through the cooling tubes 210a, the cooling connection members 210b, and the first terminal 310 of the terminal unit 300 by connecting the cooling unit 210 to the first terminal 310. Here, the first terminal 310 may include a first terminal tube 310a to circulate the cooling fluid when combined with the cooling unit 210.

As such, since the cooling unit 210 may allow the cooling fluid to flow by connecting the cooling tubes 210a to the cooling connection members 210b, referring to FIG. 2, the secondary batteries 10 may be cooled while the cooling fluid flows in through the inlet 220, circulates around the battery modules 1, 1001, 1100, 1200, 2100, and 2200, and flows out through the outlet 230.

In this case, the cooling fluid may be any of various suitable types. For example, the cooling fluid may be a gas such as air or a liquid such as water. Alternatively, the cooling fluid may be formed by, e.g., mixing water and glycol $(R(OH)_2)$ at a ratio of about 1:1 or about 6:4.

Also, the cooling tubes 210a may include heat pipes to cool the secondary batteries 10.

Figure 5:
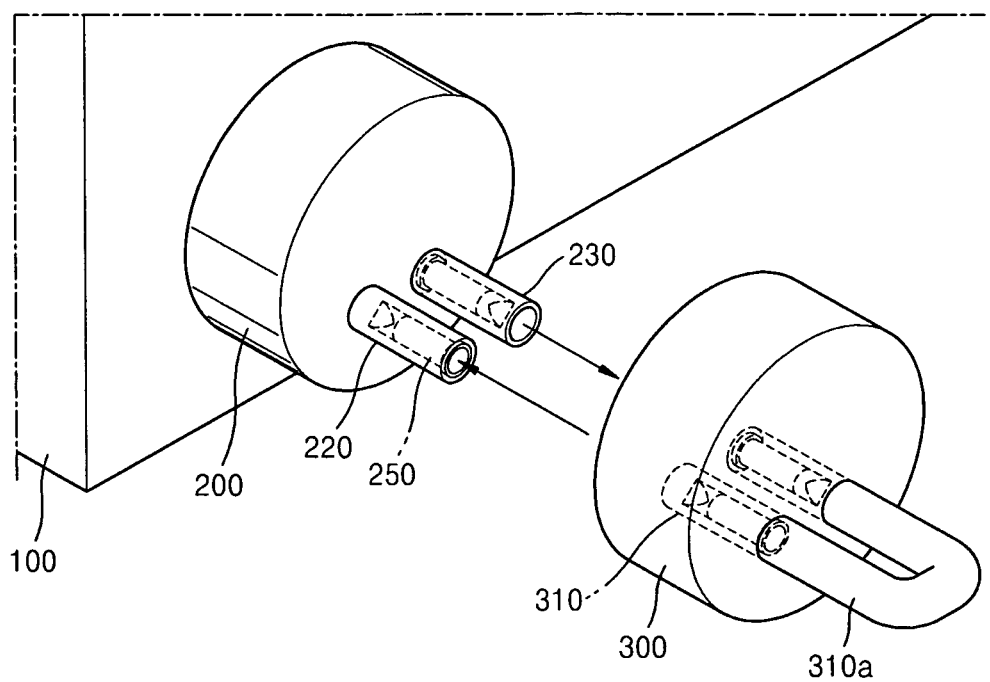
FIG. 5 illustrates a magnified perspective view of a portion A of FIG. 2.

A combination or coupling structure between a battery pack interface 200 and the terminal unit 300 will now be described with reference to FIG. 5. FIG. 5 illustrates a magnified perspective view of a portion A of FIG. 2. The battery pack interface 200 may be disposed on the housing 100 and may be coupled with the terminal unit 300. In particular, in a power providing or operating condition, the first terminal may recirculate the cooling fluid in the cooling unit 210. If the battery pack interface 200 and the terminal unit 300 are coupled, the cooling unit 210 may be coupled with the first terminal 310. That is, the inlet 220 and the outlet 230 of the cooling unit 210 may be combined with the first terminal 310. If the battery pack interface 200 and the terminal unit 300 are separated, the cooling fluid in the housing 100 may not circulate and may remain in the cooling unit 210. In this case, check valves 250 may be used to prevent the cooling fluid from spilling from the inlet 220 and the outlet 230 of the cooling unit 210. The check valves 250 may be disposed in the inlet 220 and the outlet 230 of the cooling unit 210, and may also be disposed in the first terminal 310 of the terminal unit 300.

Figure 6A:
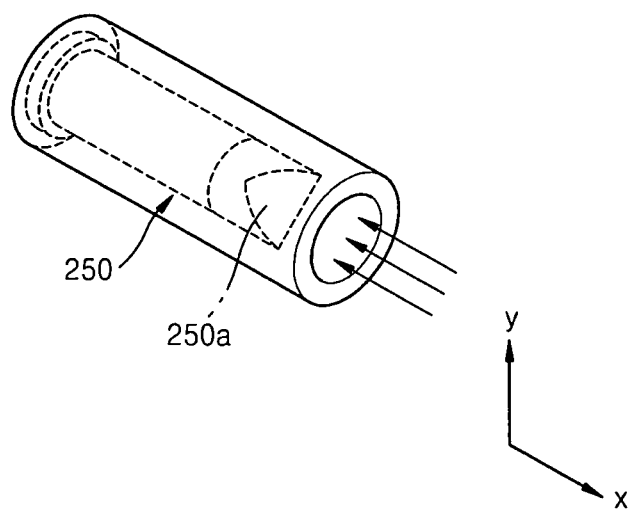
FIGS. 6A and 6B illustrate perspective views for describing operations of check valves according to a flow of a fluid, according to an embodiment.
Figure 6B:
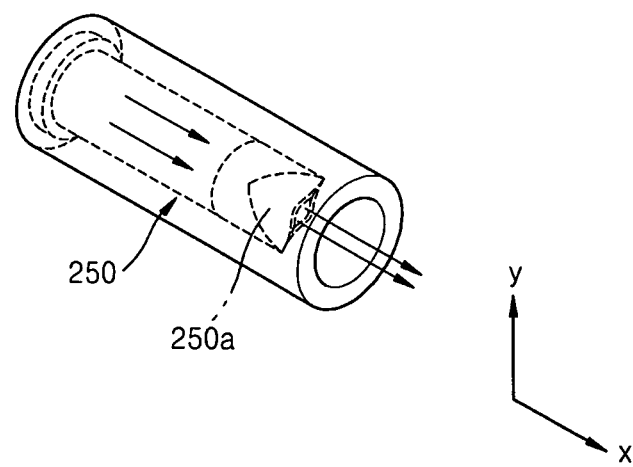

Operations of one check valve 250 will now be described with reference to FIGS. 6A and 6B. The check valve 250 may have a first side and a second side, and may be open when the cooling fluid flows from the first side to the second side and be closed when the cooling fluid flows from the second side to the first side. The check valve 250 may be disposed in at least one of the cooling unit 210 and the first terminal 310. An example of the check valve 250 will be described with reference to FIGS. 6A and 6B. As illustrated in FIGS. 6A and 6B, a check valve head 250a of the check valve 250 may be tapered in such a way that one end of the check valve head 250a in an X axis direction has a narrow cross-section and another end of the check valve head 250a in the X axis direction has a round cross-section. If the cooling fluid flows in the inverse-X axis direction, the pressure of the cooling fluid may be applied to external tapered surfaces of the check valve head 250a and thus the check valve head 250a may not open. If the cooling fluid flows in the X axis direction, the pressure of the cooling fluid may be applied to internal tapered surfaces of the check valve head 250a and thus the check valve head 250a may be open. As such, the check valve 250 may allow the cooling fluid to flow in one direction and may prevent the cooling fluid from leaking when the battery pack interface 200 and the terminal 300 are separated from each other.

Figure 7:
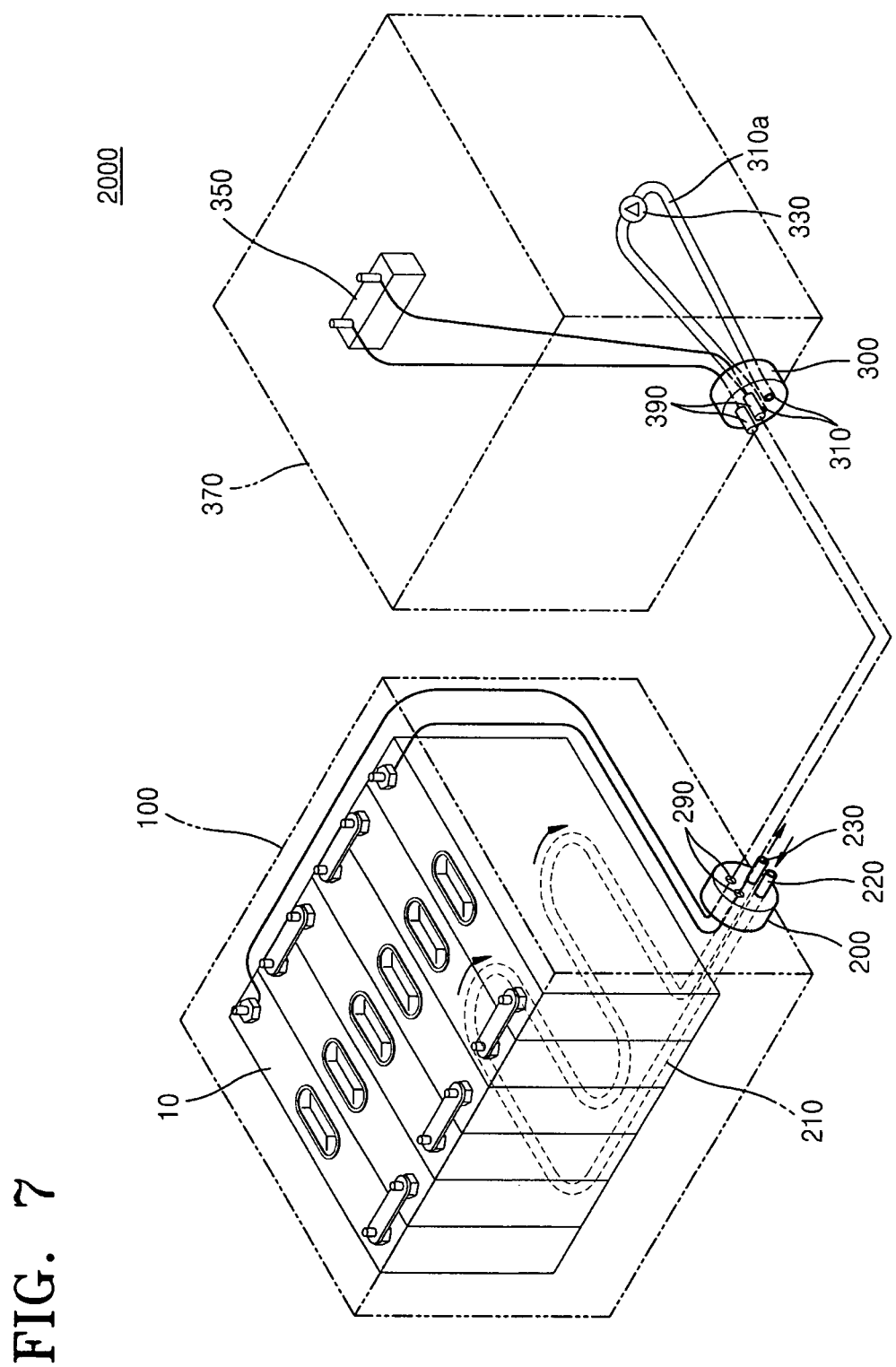
FIG. 7 illustrates a conceptual view of a battery pack according to another embodiment.
Figure 8:
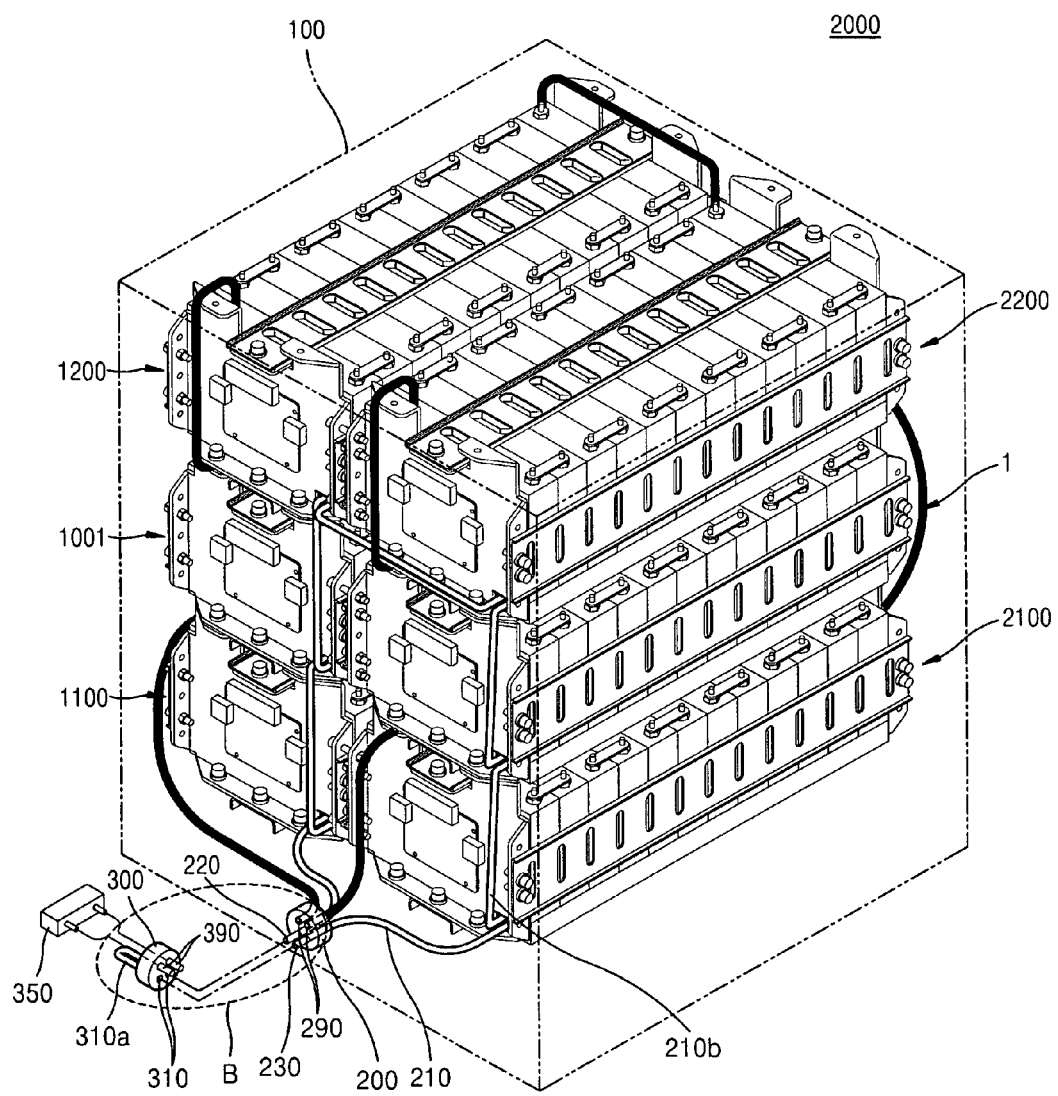
FIG. 8 illustrates a perspective view of the battery pack of FIG. 7.

A battery pack 2000 according to another embodiment will now be described with reference to FIGS. 7 and 8. FIG. 7 illustrates a conceptual view of the battery pack 2000 according to another embodiment. FIG. 8 illustrates a perspective view of the battery pack 2000 of FIG. 7.

Referring to FIGS. 7 and 8, a charge/discharge terminal 290 may be electrically connected to the secondary batteries 10 and may be formed on the housing 100. In this case, a second terminal 390 may be formed in the terminal unit 300, may be detachably and electrically connected to the charge/discharge terminal 290, and may charge/discharge the secondary batteries 10. In detail, the battery pack interface 200 may be disposed on the housing 100 and may be detachably connected to the terminal unit 300. The charge/discharge terminal 290 and the inlet 220 and the outlet 230 of the cooling unit 210 may be disposed in the battery pack interface 200. That is, the charge/discharge terminal 290 for charging/discharging the secondary batteries 10 or the battery module 1, and the cooling unit 210 for cooling the secondary batteries 10 or the battery module 1 may be disposed within one battery pack interface 200. Also, the terminal unit 300 may correspond to the battery pack interface 200 and may be disposed on a station 370. Accordingly, when the station 370 charges/discharges the battery pack 2000, one combination of terminals may simultaneously enable charging/discharging and cooling. That is, in a charging/discharging condition of the battery pack 1000, as the battery pack interface 200 and the terminal unit 300 are attached to each other, charging/discharging of the battery pack 2000 and removing of heat generated due to the charging/discharging may be performed at the same time. Although the battery pack interface 200 may protrude from the housing 100, as illustrated in FIG. 7, the shape of the battery pack interface 200 is not limited thereto and may vary. For example, the battery pack interface 200 may be recessed into the housing 100.

Here, the second terminal 390 may be connected to an external power supply device 350 so as to charge the secondary batteries 10.

Here, the battery pack interface 200 and the terminal unit 300 may be designed to prevent the cooling fluid from contacting the charge/discharge terminal 290 or the second terminal 390 and to prevent a safety accident.

Figure 9:
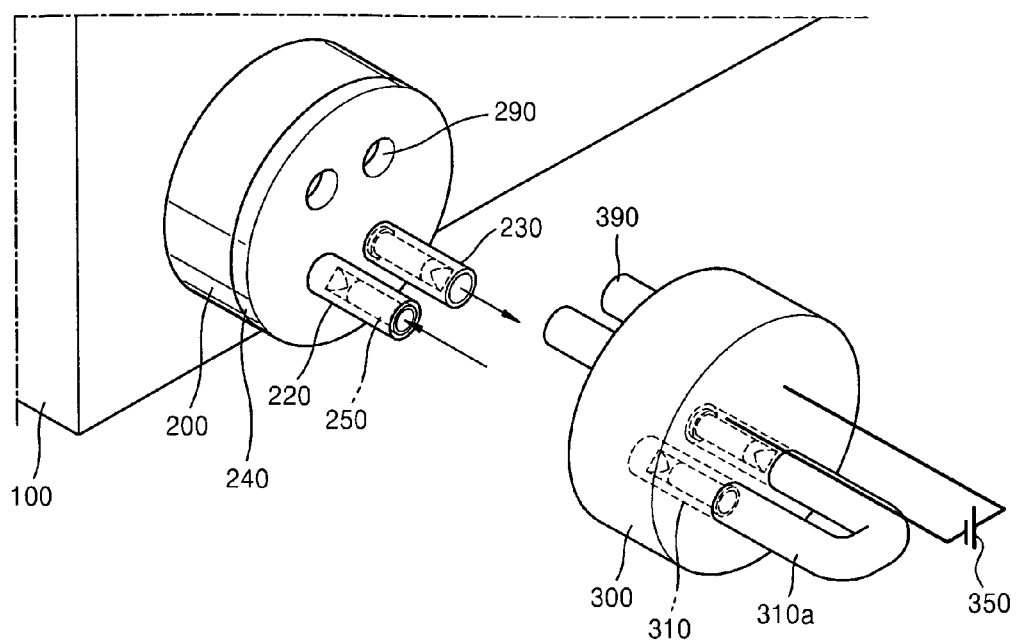
FIG. 9 illustrates a magnified perspective view of a portion B of FIG. 8.

FIG. 9 illustrates a magnified perspective view of a portion B of FIG. 8. Referring to FIG. 9, the battery pack interface 200 may further include a first insulation unit 240. The first insulation unit 240 may be formed on the battery pack interface 200 to prevent the cooling fluid from flowing into the charge/discharge terminal 290. Also, the first insulation unit 240 may insulate electricity flowing through the charge/discharge terminal 290 to prevent a safety accident.

Here, the battery pack 1000 or 2000, as illustrated in FIG. 2 or 8, may be used in an electric actuator, e.g., an electric vehicle. In this case, the battery pack 1000 or 2000 excluding the terminal unit 300 may be detachably connected to the electric vehicle to provide power to the electric vehicle. Also, the terminal unit 300 may be disposed on the station 370 outside the electric vehicle and may be connected to the battery pack interface 200 to perform charging/discharging and/or cooling.

That is, as the battery pack 1000 or 2000 excluding the terminal unit 300 is connected to the electric vehicle, i.e., in the power providing or operating condition, driving power may be provided to the electric vehicle. When charging is required, the terminal unit 300 on the station 370 may be coupled with the battery pack interface 200 of the battery pack 1000 or 2000 mounted on the electric vehicle. In this case, in the charging/discharging condition, the combination or coupling structure between the battery pack interface 200 and the terminal unit 300 may facilitate charging/discharging of the secondary batteries 10 and may also facilitate removing of heat generated due to charging/discharging.

In this case, the inlet 220 and the outlet 230 of the cooling unit 210 may be disposed below the charge/discharge terminal 290 with respect to a direction of gravitational force. In some cases, the cooling fluid may remain in the inlet 220 or the outlet 230 of the cooling unit 210 and thus may flow in the direction of gravity. Accordingly, as the inlet 220 and the outlet 230 may be disposed below the charge/discharge terminal 290 with respect to gravity, any of the cooling fluid dropped from the inlet 220 and the outlet 230 may be prevented from flowing into the charge/discharge terminal 290.

Figure 10:
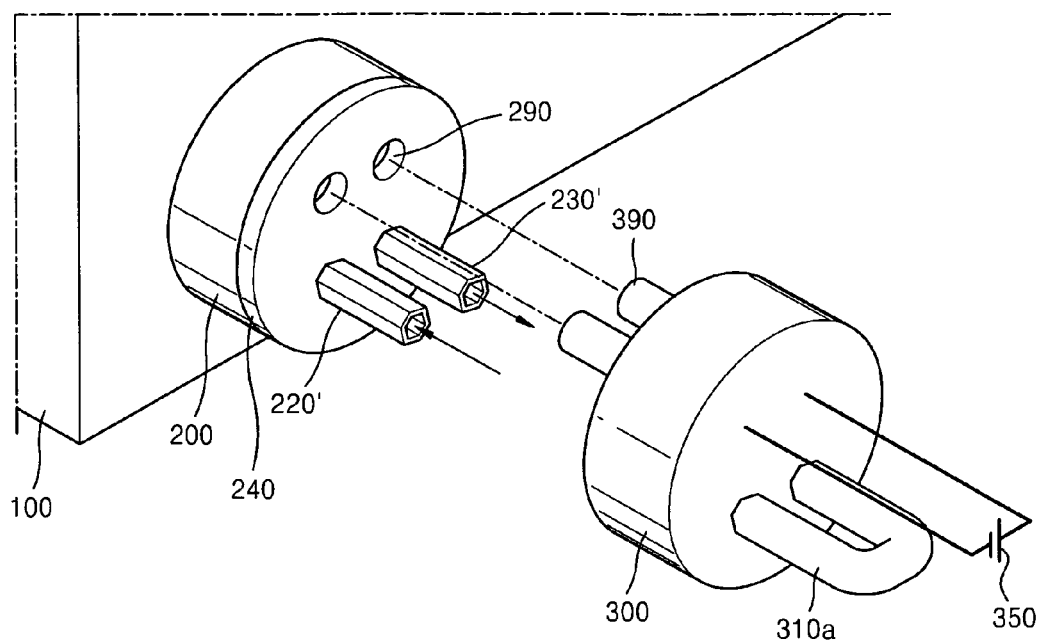
FIG. 10 illustrates a magnified perspective view of a modified example of portion B of FIG. 8.

FIG. 10 illustrates a magnified perspective view of a modified example of the portion B of FIG. 8. Referring to FIG. 10, in order to prevent wrong connection, cross-sections of an inlet 220' and an outlet 230' of the cooling unit 210 may be asymmetrical to cross-sections of the charge/discharge terminal 290. If the cross-sections of the charge/discharge terminal 290 and the inlet 220' and the outlet 230' of the cooling unit 210 are compatible with and similar to each other, the second terminal 390 may be connected to the cooling unit 210 by mistake and thus an accident, e.g., a short circuit, may occur. Accordingly, wrong connection may be prevented by forming the cross-sections of the inlet 220' and the outlet 230' of the cooling unit 210 to be asymmetrical to the cross-sections of the charge/discharge terminal 290.

Figure 11:
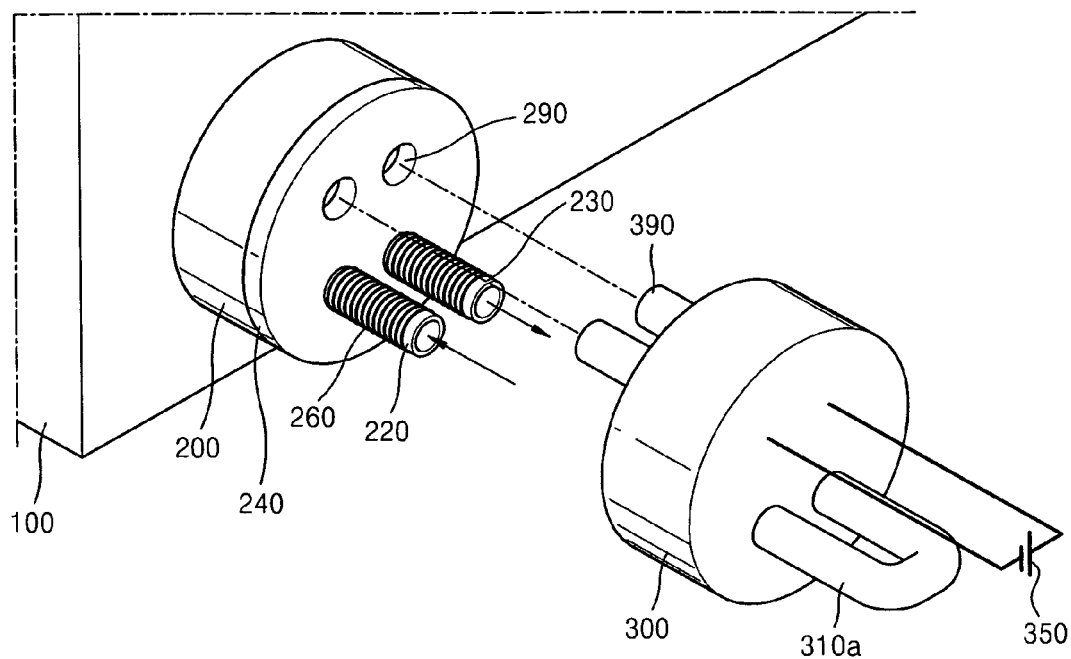
FIG. 11 illustrates a magnified perspective view of another modified example of portion B of FIG. 8.

FIG. 11 illustrates a magnified perspective view of another modified example of portion B of FIG. 8. Referring to FIG. 11, a first heating unit 260 for vaporizing the cooling fluid may be formed on circumferential surfaces of at least one of the inlet 220 and the outlet 230 of the cooling unit 210. That is, if any of the cooling fluid remains in the inlet 220 or the outlet 230 of the cooling unit 210 for some reason, the cooling fluid may contact the second terminal 390 and thus a short circuit may occur. Accordingly, the first heating unit 260 may heat the circumferential surface of the inlet 220 and/or the outlet 230 to vaporize remaining cooling fluid. In this case, the first heating unit 260 may be formed by using an electrically resistant wire, e.g., a hot wire. However, the cooling fluid vaporization method is not limited thereto and various other suitable methods may also be used.

Figure 12:
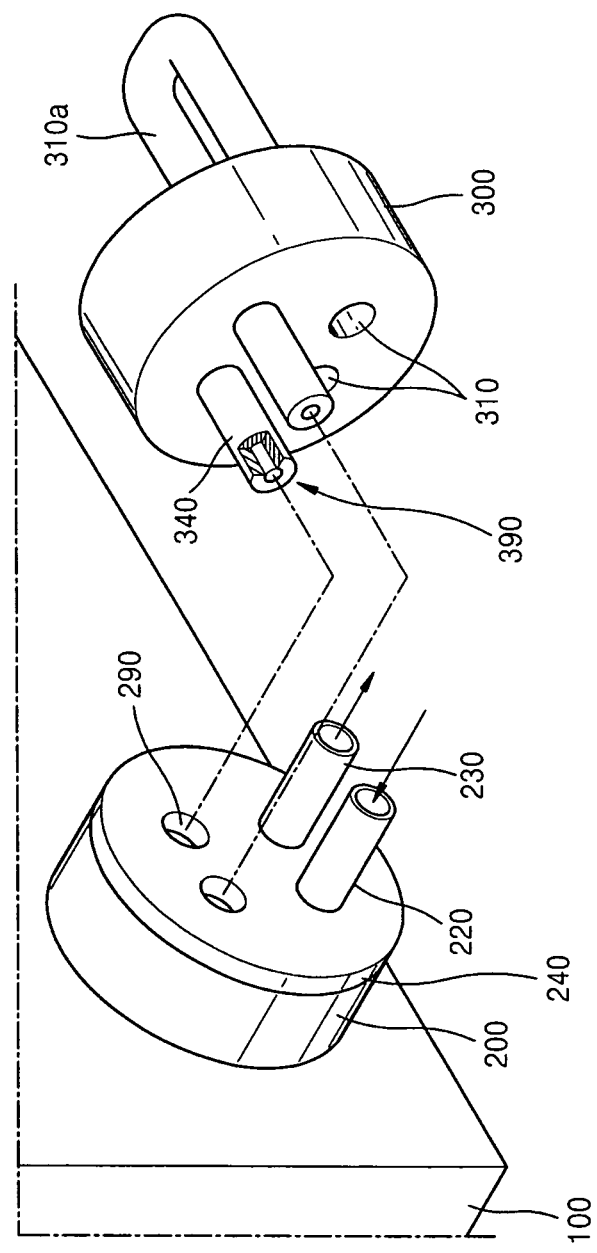
FIG. 12 illustrates a magnified perspective view of yet another modified example of portion B of FIG. 8.

FIG. 12 illustrates a magnified perspective view of yet another modified example of portion B of FIG. 8. Referring to FIG. 12, the second terminal 390 may include insulation members 340. The insulation members 340 may be formed on surfaces of the second terminal 390 in such a way that the second terminal 390 is electrically connected to the charge/discharge terminal 290 when the insulation members 340 are coupled with the charge/discharge terminal 290. As the insulation members 340 are formed on the surfaces of the second terminal 390, the second terminal 390 may be prevented from contacting any of the cooling fluid flowing from the inlet 220 or the outlet 230 of the cooling unit 210 and from being electrically shorted.

Figure 13:
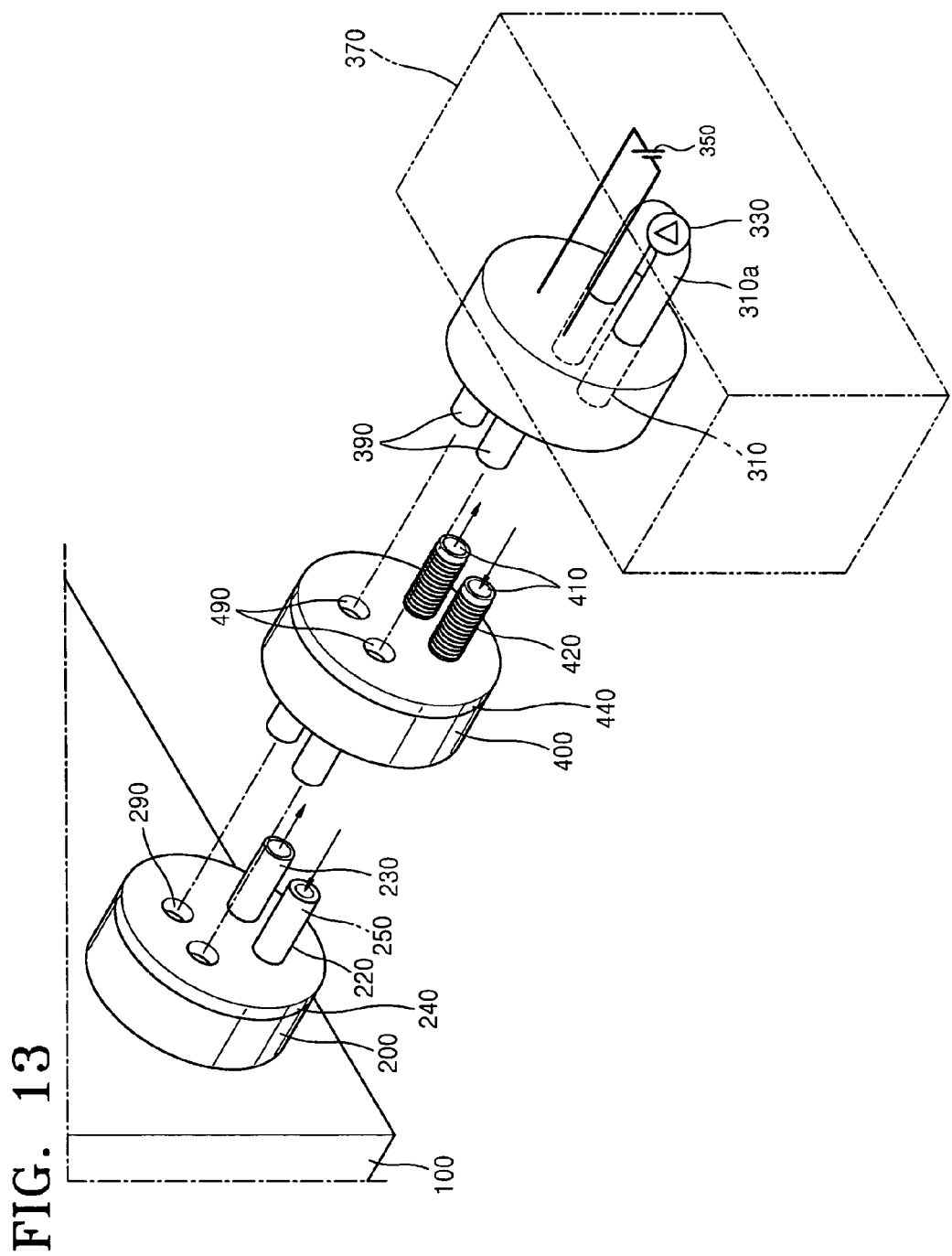
FIG. 13 illustrates a magnified perspective view of still another modified example of portion B of FIG. 8.

FIG. 13 illustrates a magnified perspective view of still another modified example of portion B of FIG. 8. Referring to FIG. 13, a connection unit 400 may be disposed between the battery pack interface 200 and the terminal unit 300 and may be detachably connected to each of the battery pack interface 200 and the terminal unit 300. That is, the battery pack interface 200 may be detachably connected to the connection unit 400 and the connection unit 400 may be detachably connected to the terminal unit 300.

Here, the connection unit 400 may include a cooling connection terminal 410 and a power connection terminal 490. The cooling connection terminal 410 may have surfaces detachably connected to the inlet 220 and the outlet 230 of the cooling unit 210 and other surfaces detachably connected to the first terminal 310.

The power connection terminal 490 may have surfaces detachably connected to the charge/discharge terminal 290 and other surfaces detachably connected to the second terminal 390.

In this case, cross-sections of the cooling connection terminal 410 may be asymmetrical to cross-sections of the power connection terminal 490. The cooling connection terminal 410 and the power connection terminal 490 may have shapes that may be connected to the battery pack interface 200 and/or the terminal unit 300.

Figure 14:
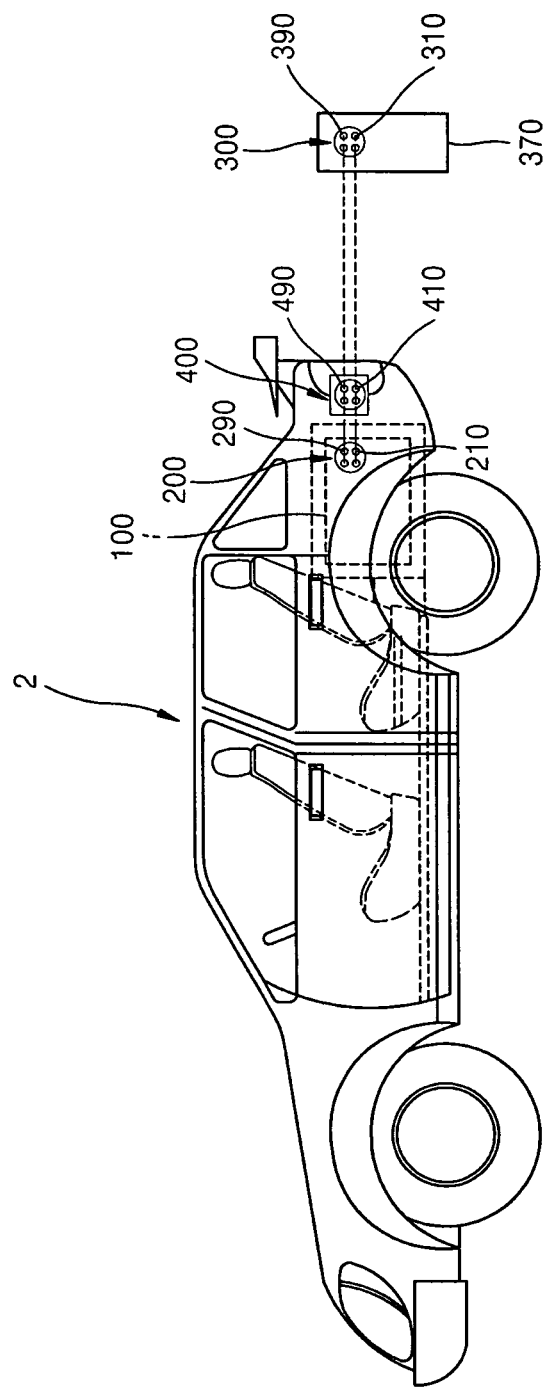
FIG. 14 illustrates a conceptual view of a vehicle to which a battery pack interface, a terminal unit, and a connection unit illustrated in FIG. 13 are applied.

An electric vehicle 2 to which the battery pack interface 200, the terminal unit 300, and the connection unit 400 illustrated in FIG. 13 are applied will now be described with reference to FIG. 14. Referring to FIG. 14, the battery pack 2000 excluding the terminal unit 300 may be detachably connected to the electric vehicle 2 to provide power to the electric vehicle 2. In this case, the terminal unit 300 may be disposed on the station 370 outside the electric vehicle 2. The connection unit 400 may be disposed on the electric vehicle 2. That is, although the battery pack 2000 mounted on the electric vehicle 2 may be directly charged/discharged by the terminal unit 300, as illustrated in FIG. 14, the battery pack 2000 may be connected to one surface of the connection unit 400 disposed on the electric vehicle 2, and another surface of the connection unit 400 may be connected to the terminal unit 300 of the station 370 outside the electric vehicle 2. Accordingly, the battery pack 2000 mounted on the electric vehicle 2 may be charged/discharged without separating the battery pack 2000 from the electric vehicle 2 by connecting the terminal unit 300 of the station 370 to the connection unit 400 while the battery pack 2000 is in the charging/discharging condition.

Here, the connection unit 400 may further include the check valves 250 described above in relation to FIGS. 6A and 6B. As such, the cooling fluid may circulate in one direction.

Also, as illustrated in FIG. 13, the connection unit 400 may further include a second insulation unit 440. The second insulation unit 440 may be formed on at least one surface of the connection unit 400 and may prevent the cooling fluid from flowing into portions where electricity flows.

Also, the connection unit 400 may further include a second heating unit 420 on at least one circumferential surface of the cooling connection terminal 410. The second heating unit 420 may be for vaporizing the cooling fluid. In this case, the second heating unit 420 may be formed by using an electrically resistant wire, e.g., a hot wire. However, the cooling fluid vaporization method is not limited thereto and various other suitable methods may also be used.

The embodiments may be applied to every industry that uses a battery pack.

According to one or more embodiments, since a cooling unit and a charge/discharge terminal may be formed within the same interface, a battery pack may thus be easily attachable and detachable.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery pack, comprising:
   a housing for accommodating a plurality of secondary batteries;
   a cooling unit for cooling the secondary batteries, the cooling unit including an inlet through which a cooling fluid flows in and an outlet through which the cooling fluid flows out; and
   a terminal unit detachably connected to the cooling unit, the terminal unit including a first terminal for circulating the cooling fluid,
   wherein the first terminal is connected to the cooling unit so as to form a closed loop.

2. The battery pack as claimed in claim 1, further comprising a check valve having a first side and a second side, the check valve being open when the cooling fluid flows from the first side to the second side and being closed when the cooling fluid flows from the second side to the first side,
   wherein the check valve is disposed in at least one of the cooling unit and the first terminal.

3. The battery pack as claimed in claim 1, wherein the cooling unit further includes a first heating unit on circumferential surfaces of at least one of the inlet and the outlet of the cooling unit, the first heating unit being for vaporizing the cooling fluid.

4. The battery pack as claimed in claim 1, wherein the first terminal includes a circulator for circulating the cooling fluid.

5. The battery pack as claimed in claim 1, wherein the cooling unit includes a plurality of cooling packs connected to each other by cooling connection members.

6. The battery pack as claimed in claim 5, wherein:
   the housing accommodates a plurality of battery modules, and
   each of the battery modules includes:
      a plurality of secondary batteries arranged in a row;
      a plurality of the cooling packs in thermal co-operation with the plurality of secondary batteries;
      a pair of end plates at ends of the secondary batteries and the cooling packs;
      restraint plates, the restraint plates compressing the secondary batteries in a length direction, supporting the cooling packs, and being connected to side portions of the end plates;
      a top plate connected to top portions of the end plates; and
      a bottom plate connected to bottom portions of the end plates.

7. The battery pack as claimed in claim 6, wherein one of the cooling packs is between the secondary batteries and the bottom plate.

8. The battery pack as claimed in claim 6, wherein the cooling packs are between the secondary batteries and the restraint plates.

9. The battery pack as claimed in claim 6, wherein the cooling packs include heat pipes.

10. The battery pack as claimed in claim 6, wherein at least one of the end plates includes cooling holes, the cooling connection members being connected to the cooling packs through the cooling holes.

11. The battery pack as claimed in claim 1, further comprising:
a charge/discharge terminal electrically connected to the secondary batteries, the charge/discharge terminal being on the housing; and
a second terminal in the terminal unit, the second terminal unit being detachably, electrically connected to the charge/discharge terminal and being for charging/discharging the secondary batteries.

12. The battery pack as claimed in claim 11, wherein a shape of cross-sections of the inlet and the outlet of the cooling unit are asymmetrical to a shape of cross-sections of the charge/discharge terminal.

13. The battery pack as claimed in claim 11, further comprising a battery interface on the housing, the battery interface being detachably connected to the terminal unit and in which the charge/discharge terminal and the inlet and the outlet of the cooling unit are disposed.

14. The battery pack as claimed in claim 13, wherein the battery interface includes a first insulation unit.

15. The battery pack as claimed in claim 13, wherein the second terminal includes insulation members.

16. The battery pack as claimed in claim 13, wherein the inlet and the outlet of the cooling unit are below the charge/discharge terminal with respect to gravity.

17. The battery pack as claimed in claim 13, wherein, in a power providing condition of the battery pack, in which the battery pack provides power to a vehicle, the terminal unit is detachably connected to the cooling unit.

18. The battery pack as claimed in claim 13, wherein, in a charging/discharging condition of the battery pack, the terminal unit is detachably connected to the cooling unit and disposed on a station outside of a vehicle.

19. The battery pack as claimed in claim 13, further comprising a connection unit between the battery interface and the terminal unit, the connection unit being detachably connected to each of the battery interface and the terminal unit.

20. The battery pack as claimed in claim 19, wherein the connection unit includes:
a cooling connection terminal, the cooling connection terminal having surfaces detachably connected to the inlet and the outlet of the cooling unit and having other surfaces detachably connected to the first terminal; and
a power connection terminal, the power connection terminal having surfaces detachably connected to the charge/discharge terminal and having other surfaces detachably connected to the second terminal, and
wherein a shape of cross-sections of the cooling connection terminal is asymmetrical to a shape of cross-sections of the power connection terminal.

21. The battery pack as claimed in claim 19, wherein, in a power providing condition of the battery pack, in which the battery pack provides power to a vehicle, the terminal unit is detachably connected to the cooling unit through the connection unit.

22. The battery pack as claimed in claim 19, wherein, in a charging/discharging condition of the battery pack, the terminal unit is detachably connected to the cooling unit through the connection unit and is disposed on a station outside of a vehicle.

23. The battery pack as claimed in claim 19, wherein the connection unit further includes a check valve having a first side and a second side, the check valve being open when the cooling fluid flows from the first side to the second side and being closed when the cooling fluid flows from the second side to the first side.

24. The battery pack as claimed in claim 19, wherein the connection unit further includes a second insulation unit.

25. The battery pack as claimed in claim 19, wherein the connection unit further includes a second heating unit for vaporizing cooling fluid on a surface of the connection unit.

26. The battery pack as claimed in claim 11, wherein the second terminal is connected to an external power supply device.

27. A battery pack, comprising:
a housing for accommodating a plurality of secondary batteries;
a cooling unit for cooling the secondary batteries, the cooling unit including an inlet through which a cooling fluid flows in and an outlet through which the cooling fluid flows out; and
a terminal unit detachably connected to the cooling unit, the terminal unit including a first terminal for circulating the cooling fluid,
wherein the first terminal includes a circulator for circulating the cooling fluid.

* * * * *